US011865623B2

(12) United States Patent
Choe et al.

(10) Patent No.: US 11,865,623 B2
(45) Date of Patent: Jan. 9, 2024

(54) MAGNETIC POWDER AND METHOD OF PREPARING MAGNETIC POWDER

(71) Applicant: LG Chem, Ltd., Seoul (KR)

(72) Inventors: Jinhyeok Choe, Daejeon (KR); Ikjin Choi, Daejeon (KR); Hyounsoo Uh, Daejeon (KR); Soon Jae Kwon, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/761,309

(22) PCT Filed: Aug. 6, 2019

(86) PCT No.: PCT/KR2019/009813

§ 371 (c)(1),
(2) Date: May 4, 2020

(87) PCT Pub. No.: WO2020/032547

PCT Pub. Date: Feb. 13, 2020

(65) Prior Publication Data

US 2021/0151227 A1 May 20, 2021

(30) Foreign Application Priority Data

Aug. 10, 2018 (KR) ........................ 10-2018-0093981
Jul. 30, 2019 (KR) ........................ 10-2019-0092709

(51) Int. Cl.
*B22F 9/20* (2006.01)
*H01F 1/059* (2006.01)
(Continued)

(52) U.S. Cl.
CPC ................ *B22F 9/20* (2013.01); *B22F 1/105* (2022.01); *B22F 1/142* (2022.01); *H01F 1/0593* (2013.01)

(58) Field of Classification Search
CPC ........ B22F 1/00; B22F 1/0003; B22F 1/0081; B22F 1/0085; B22F 3/001; B22F 3/10;
(Continued)

(56) References Cited

U.S. PATENT DOCUMENTS 5,466,307 A 11/1995 Tong et al.
5,769,969 A 6/1998 Ishikawa et al.
(Continued)

FOREIGN PATENT DOCUMENTS

CN 1424164 A 6/2003
CN 101546642 A 9/2009
(Continued)

OTHER PUBLICATIONS

Chinese Search Report for Application No. 201980005689.8 dated Mar. 1, 2021, 3 pages.
(Continued)

*Primary Examiner* — Vanessa T. Luk
(74) *Attorney, Agent, or Firm* — Lerner David LLP

(57) ABSTRACT

A magnetic powder and a method for fabricating the same according to an embodiment of the present disclosure are provided. The magnetic powder is powder particles synthesized using a mixture of a rare earth oxide, a raw material, a metal, a metal oxide and a reducing agent, wherein the powder particles are single-phase, the raw material includes at least one of Fe and Co, the metal includes at least one of Ti, Zr, Mn, Mo, V and Si, and the metal oxide includes at least one of $MnO_2$, $MoO_3$, $V_2O_5$, $SiO_2$, $ZrO_2$ and $TiO_2$.

14 Claims, 6 Drawing Sheets

(51) Int. Cl.
*B22F 1/142* (2022.01)
*B22F 1/105* (2022.01)

(58) Field of Classification Search
CPC ...... B22F 3/1003; B22F 3/1007; B22F 3/101; B22F 3/1017; B22F 3/1021; B22F 3/1025; B22F 3/1028; B22F 3/1035; B22F 3/1039; B22F 3/105; B22F 2003/1014; B22F 2003/1032; B22F 2003/1051; B22F 2003/1052; B22F 2003/1053; B22F 2003/1054; B22F 9/16; B22F 9/18; B22F 9/20; B22F 2201/01; B22F 2201/013; B22F 2201/016; B22F 2301/15; B22F 2301/155; B22F 2301/35; B22F 2301/355; B22F 2301/40; B22F 2302/25; B22F 2302/253; B22F 2302/256
See application file for complete search history.

(56) References Cited

U.S. PATENT DOCUMENTS

| | | | | |
|---|---|---|---|---|
| 5,800,728 | A * | 9/1998 | Iwata | C23C 8/24 148/301 |
| 2004/0028946 | A1 | 2/2004 | Oda et al. | |
| 2016/0071635 | A1 | 3/2016 | Sakuma et al. | |
| 2017/0084370 | A1 | 3/2017 | Sakuma et al. | |
| 2017/0178772 | A1 * | 6/2017 | Sakuma | C22C 38/10 |

FOREIGN PATENT DOCUMENTS

| | | | | |
|---|---|---|---|---|
| CN | 105405553 | A | | 3/2016 |
| JP | H09143636 | A | | 6/1997 |
| JP | 2005142374 | A | | 6/2005 |
| JP | 2005179773 | A | * | 7/2005 |
| JP | 2005179773 | A | | 7/2005 |
| JP | 2005272986 | A | | 10/2005 |
| JP | 2006291257 | A | | 10/2006 |
| JP | 2011035006 | A | | 2/2011 |
| JP | 2015098623 | A | | 5/2015 |
| JP | 2016058707 | A | | 4/2016 |
| JP | 2017057471 | A | | 3/2017 |
| JP | 2017073544 | A | | 4/2017 |
| JP | 2018031048 | A | | 3/2018 |
| JP | 2018090892 | A | | 6/2018 |
| KR | 20030063118 | A | | 7/2003 |
| KR | 20120043273 | A | | 5/2012 |
| KR | 20160030366 | A | | 3/2016 |
| KR | 20170104118 | A | | 9/2017 |
| WO | 2016162990 | A1 | | 10/2016 |

OTHER PUBLICATIONS

Extended European Search Report including Written Opinion for Application No. EP19847634.3 dated Jan. 15, 2021, 9 pages.
International Search Report for Application No. PCT/KR2019/009813 dated Dec. 3, 2019, 2 pages.
Chinese Search Report for Application No. 201980005689.8, dated Sep. 7, 2021, 2 pages.

* cited by examiner

【FIG. 1】
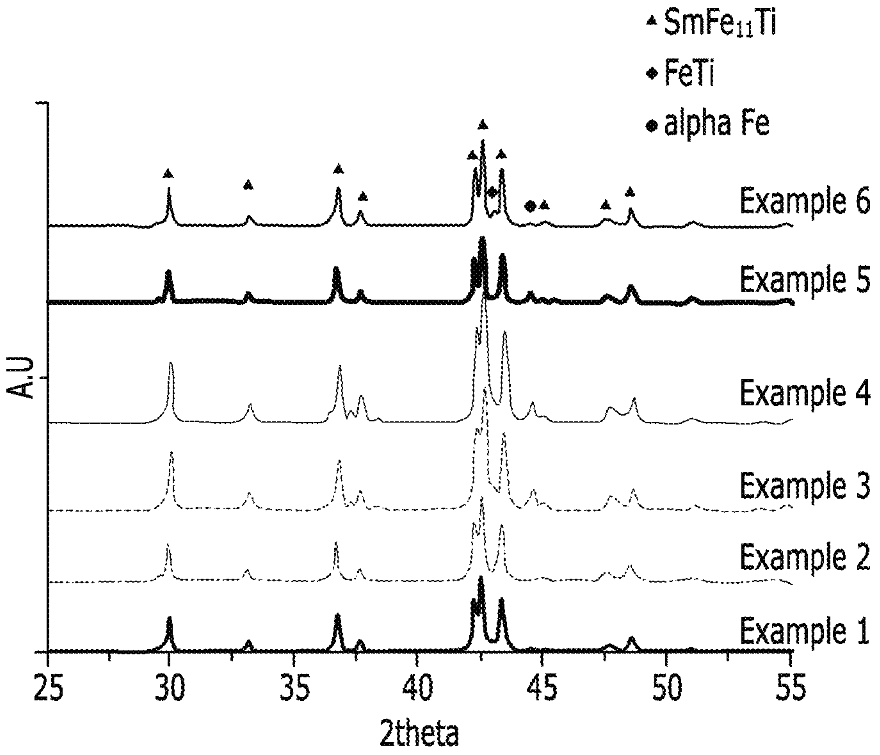

【FIG. 2】
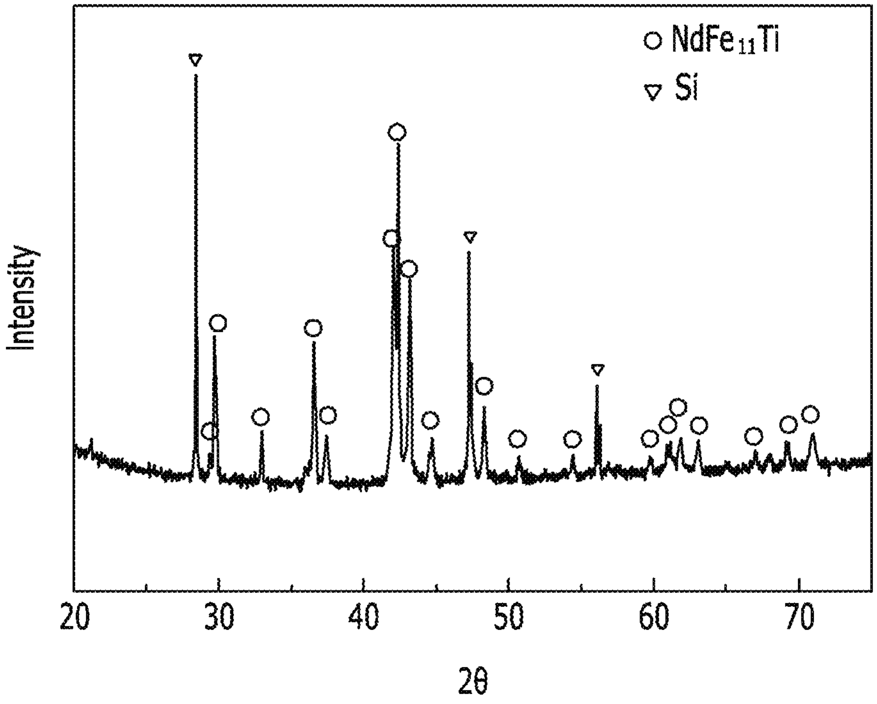

[FIG. 3]
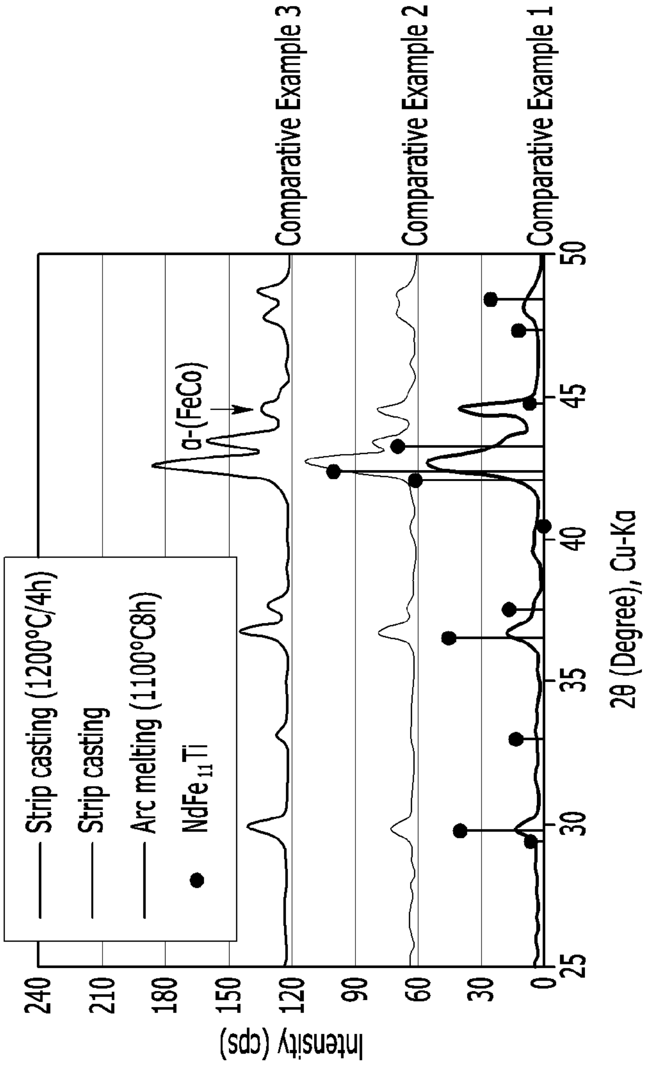

【FIG. 4】
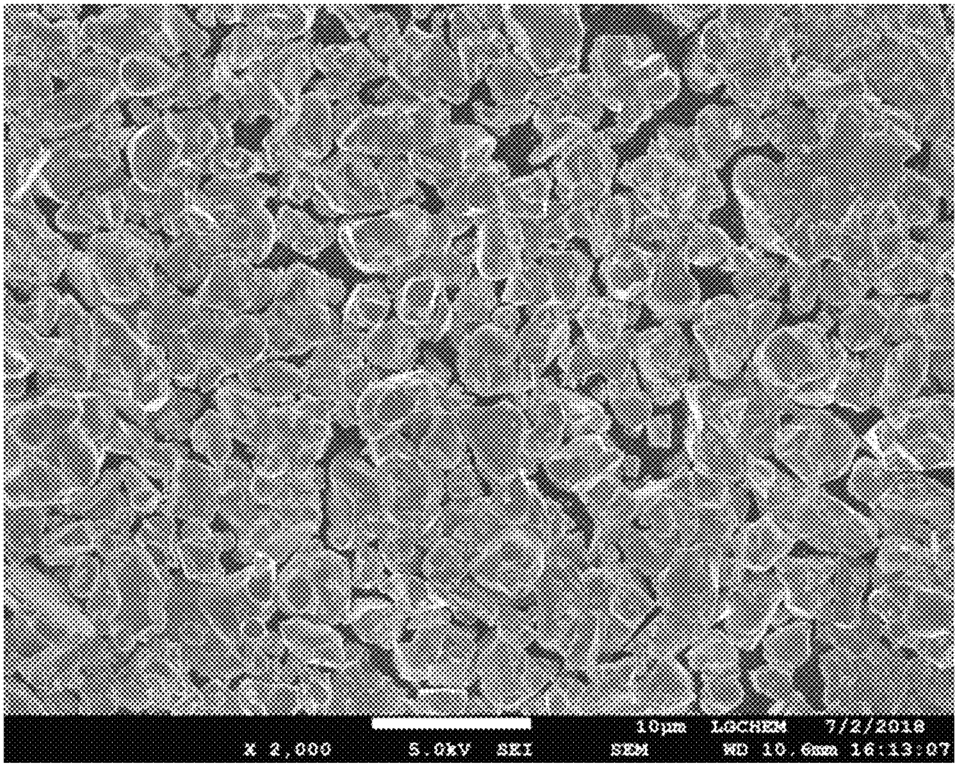
【FIG. 5】
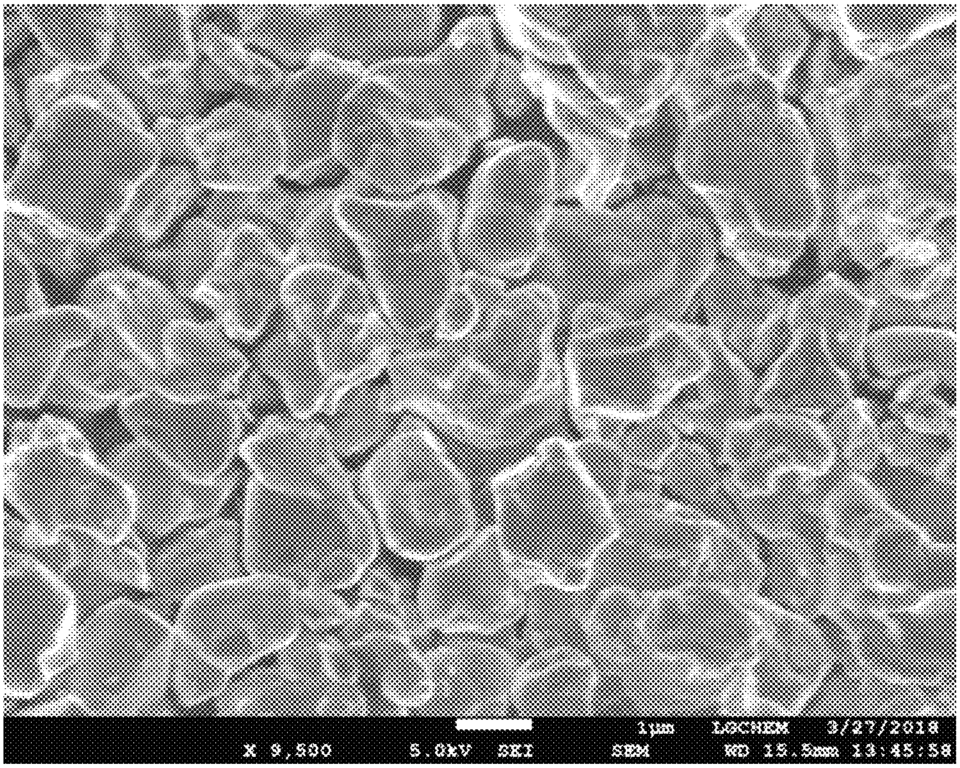

【FIG. 6】
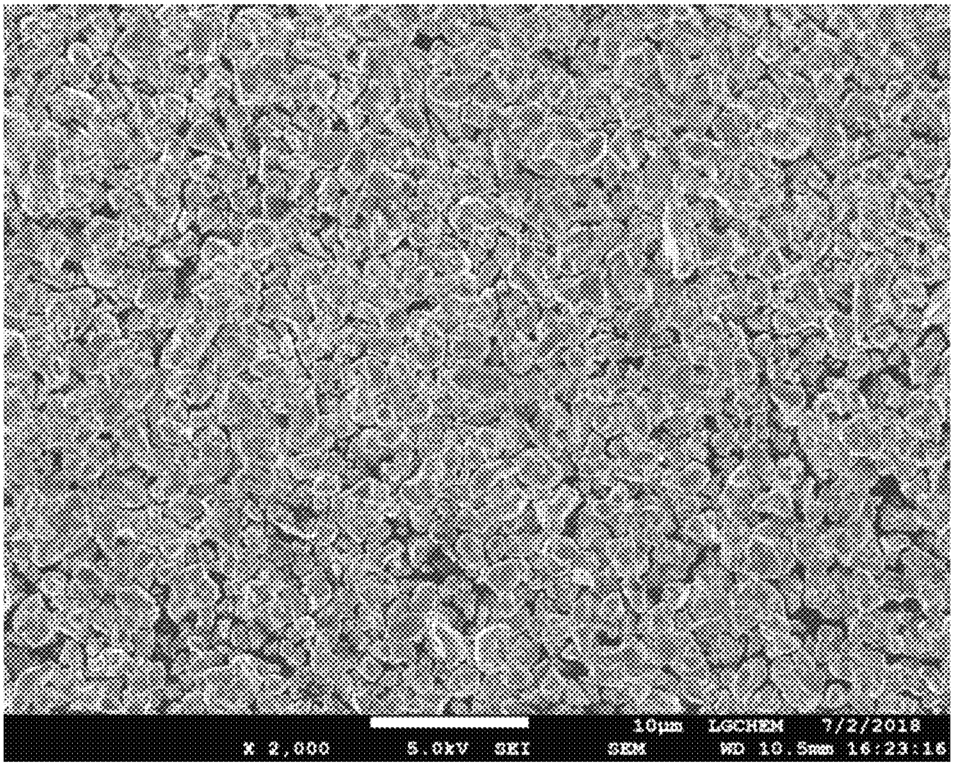

【FIG. 7】
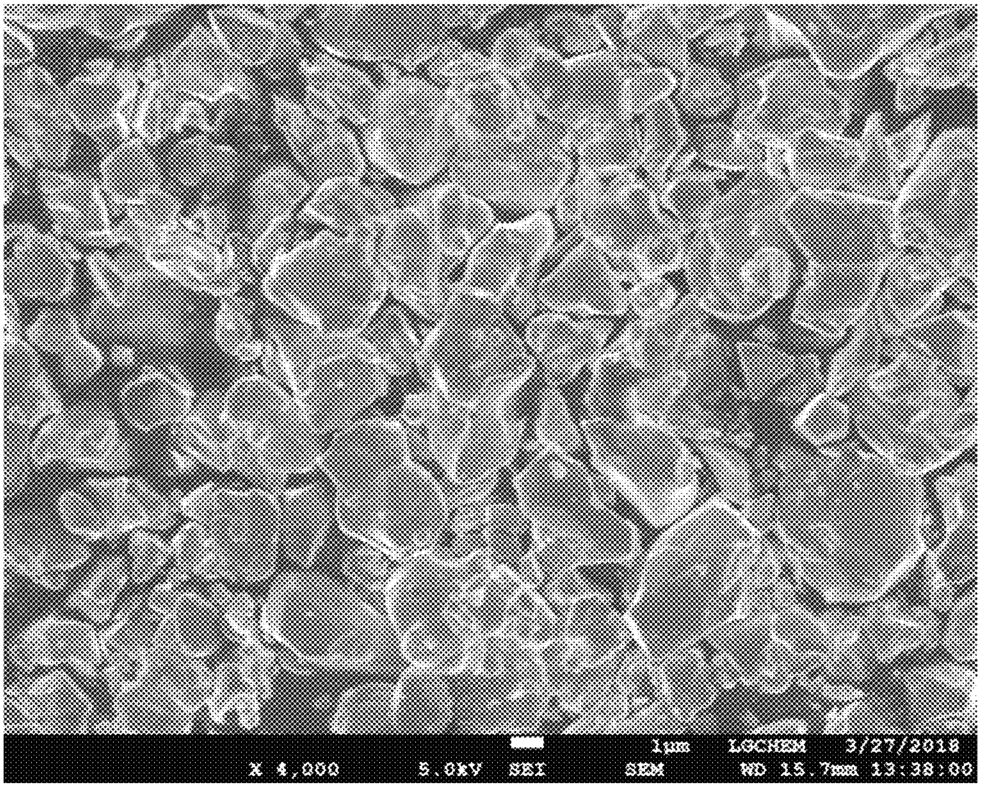

MAGNETIC POWDER AND METHOD OF PREPARING MAGNETIC POWDER

CROSS-REFERENCE TO RELATED APPLICATION

The present application is a national phase entry under 35 U.S.C. § 371 of International Application No. PCT/KR2019/009813 filed Aug. 6, 2019 which claims priority from Korean Patent Applications No. 10-2018-0093981 filed on Aug. 10, 2018 and No. 10-2019-0092709 filed on Jul. 30, 2019 with the Korean Intellectual Property Office, the disclosures of which are incorporated herein by reference in their entirety.

TECHNICAL FIELD

The present disclosure relates to magnetic powder and a method of preparing the same. More specifically, the present disclosure relates to magnetic powder including a rare earth element having a $ThMn_{12}$ structure and a method of preparing the magnetic powder.

BACKGROUND OF ART $SmFe_{12}$-based magnets having a $ThMn_{12}$ structure have superior magnetic properties at room temperature as compared to the existing $Nd_2Fe_{14}B$ structure as follows.

$$Sm(Fe_{0.8}Co_{0.2})_{12}: \mu_0 M_s=1.78T, \mu_0 H_a=12T\ Nd_2Fe_{14}B: \mu_0 M_s=1.61T, \mu_0 H_a=7.6T$$

($\mu_0$: permeability of vacuum, $M_s$: intensity of spontaneous magnetization, $H_a$: strength of magnetic anisotropy).

In addition, its Curie temperature, which is the temperature at which the magnetic material loses its magnetism, is higher than 800K, which means higher thermal stability than $Nd_2Fe_{14}B$.

It is known that magnetic powder is generally prepared by a strip/mold casting or melt spinning method based on metal powder metallurgy. First of all, the strip/mold casting method refers to a process of melting metals such as rare earth metals, iron, etc. through heat-treatment to prepare an ingot; coarsely pulverizing crystal grain particles; and preparing microparticles through a refining process. This process is repeated to obtain powder, which then undergoes a pressing and sintering process under a magnetic field to produce an anisotropic sintered magnet.

Also, the melt spinning method is performed in such a way that metal elements are melt; then poured into a wheel rotating at a high speed to be quenched; then pulverized with a jet mill; then blended with a polymer to form a bonded magnet or pressed to prepare a magnet.

However, when the $SmFe_{12}$-based magnet is prepared by a strip casting, it is difficult not only to obtain single-phase, but also to obtain powder whose particle size is controlled to several micrometers. In addition, phase separation occurs when hydrogen is absorbed to make particles small using a jet mill, and thus it is difficult to maintain single-phase.

DETAILED DESCRIPTION OF THE INVENTION

Technical Problem

A task to be solved by embodiments of the present disclosure is to solve the problems as above, and the embodiments of the present disclosure are to provide single-phase magnetic powder in which a particle size of particles of the magnetic powder is controlled to a certain size or less, and a method of preparing the same.

Technical Solution

Magnetic powder according to an embodiment of the present disclosure for solving the above problems is powder particles synthesized using a mixture of a rare earth oxide, a raw material, a metal, a metal oxide and a reducing agent, wherein the powder particles are single-phase, the raw material includes at least one of Fe and Co, the metal includes at least one of Ti, Zr, Mn, Mo, V and Si, and the metal oxide includes at least one of $MnO_2$, $MoO_3$, $V_2O_5$, $SiO_2$, $ZrO_2$ and $TiO_2$.

The reducing agent may include at least one of Ca, Mg, $CaH_2$, Na and Na—K alloy.

The magnetic powder may have a $ThMn_{12}$ structure.

The rare earth oxide may include neodymium oxide or samarium oxide.

The mixture further may include at least one of Cu, Al, Ga, $CuF_2$, $CaF_2$ and $GaF_3$.

The magnetic powder may have a $ThMn_{12}$ structure, and a composition of $R_{1-x}Zr_x(Fe_{1-y}Co_y)_{12-z}T_zM$ $\{(0\le x\le 0.2), (0\le y\le 0.2), (0\le z\le 1)\}$, wherein the R is Nd or Sm, the M is Cu, Al or Ga, and the T is Mn, Mo, V, Si or Ti.

The magnetic powder may have a composition of $Sm_{1-x}Zr_x(Fe_{1-y}Co_y)_{12-z}T_zM$ $\{(0\le x\le 0.2), (0\le y\le 0.2), (0\le z\le 1)\}$, wherein the M is Cu, Al or Ga, and the T is Mn, Mo, V, Si or Ti.

An average particle size of the particles constituting the magnetic powder may be 10 micrometers or less.

A method of preparing magnetic powder according to an embodiment of the present disclosure includes the steps of: preparing a mixture by mixing a rare earth oxide, a raw material, a metal, a metal oxide and a reducing agent; and synthesizing magnetic powder by heat-treating the mixture at a temperature of 800° C. to 1100° C. with a reduction-diffusion method, wherein the raw material comprises at least one of Fe and Co, the metal comprises at least one of Ti, Zr, Mn, Mo, V and Si, the metal oxide comprises at least one of $MnO_2$, $MoO_3$, $V_2O_5$, $SiO_2$, $ZrO_2$ and $TiO_2$, and the magnetic powder has single-phase powder particles.

The reducing agent may include at least one of Ca, Mg, $CaH_2$, Na and Na—K alloy.

The heat-treating may be performed for 10 minutes to 6 hours.

The synthesized magnetic powder may have a $ThMn_{12}$ structure.

The rare earth oxide may include neodymium oxide or samarium oxide.

The mixture may further include at least one of Cu, Al, Ga, $CuF_2$, $CaF_2$ and $GaF_3$.

The magnetic powder may have a $ThMn_{12}$ structure, and a composition of $R_{1-x}Zr_x(Fe_{1-y}Co_y)_{12-z}T_zM$ $\{(0\le x\le 0.2), (0\le y\le 0.2), (0\le z\le 1)\}$, wherein the R is Nd or Sm, the M is Cu, Al or Ga, and the T is Mn, Mo, V, Si or Ti.

The magnetic powder may have a composition of $Sm_{1-x}Zr_x(Fe_{1-y}Co_y)_{12-z}T_zM$ $\{(0\le x\le 0.2), (0\le y\le 0.2), (0\le z\le 1)\}$, wherein the M is Cu, Al or Ga, and the T is Mn, Mo, V, Si or Ti.

An average particle size of the particles constituting the magnetic powder may be 10 micrometers or less.

Advantageous Effects

According to embodiments of the present disclosure, it is possible to provide single-phase magnetic powder with reduced secondary phase by a reduction-diffusion method, and to control an average particle size of particles constituting the magnetic powder to 10 micrometers or less, thereby preventing a decrease in saturation magnetization of main phase and a decrease in coercive force of permanent magnet.

BRIEF DESCRIPTION OF THE DRAWINGS

FIG. 1 shows XRD patterns of the magnetic powders prepared in Examples 1 to 6.

FIG. 2 shows an XRD pattern of the magnetic powder prepared in Example 7.

FIG. 3 shows XRD patterns of the magnetic powders prepared in Comparative Examples 1 to 3.

FIGS. 4 and 5 are scanning electron microscope images of the magnetic powder prepared in Example 1.

FIGS. 6 and 7 are scanning electron microscope images of the magnetic powder prepared in Example 2.

DETAILED DESCRIPTION OF THE EMBODIMENTS

Hereinafter, with reference to the accompanying drawings, various embodiments of the present disclosure will be described in more detail such that those skilled in the art, to which the present disclosure pertains, may easily practice the present disclosure. The present disclosure may be implemented in various different forms, and is not limited to the embodiments described herein.

Also, throughout the present specification, when any part is said to “include” or “comprise” a certain component, this means that the part may further include other components rather than excluding the other components, unless otherwise particularly specified.

Hereinafter, the magnetic powder according to an embodiment of the present disclosure will be described in detail.

The magnetic powder according to an embodiment of the present disclosure are powder particles synthesized using a mixture of a rare earth oxide, a raw material, a metal, a metal oxide and a reducing agent, wherein the powder particles are single-phase, the raw material includes at least one of Fe and Co, the metal includes at least one of Ti, Zr, Mn, Mo, V and Si, and the metal oxide includes at least one of $MnO_2$, $MoO_3$, $V_2O_5$, $SiO_2$, $ZrO_2$ and $TiO_2$.

The reducing agent may include at least one of Ca, Mg, $CaH_2$, Na and Na—K alloy. Particularly, $CaH_2$ is preferable. The rare earth oxide may include neodymium oxide or samarium oxide.

The magnetic powder may have a $ThMn_{12}$ structure. The $ThMn_{12}$ structure magnet has superior magnetic properties at room temperature than $Nd_2Fe_{14}B$ structure magnet, and its Curie temperature is higher than 800K, which means higher thermal stability than $Nd_2Fe_{14}B$.

The mixture may further include at least one of Cu, Al, Ga, $CuF_2$, $CaF_2$ and $GaF_3$. In this case, the magnetic powder with a $ThMn_{12}$ structure may have a composition of $R_{1-x}Zr_x(Fe_{1-y}Co_y)_{12-z}T_zM$ $\{(0 \le x \le 0.2), (0 \le y \le 0.2), (0 \le z \le 1)\}$, wherein the R is Nd or Sm, the M is Cu, Al or Ga, and the T is Mn, Mo, V, Si or Ti. More specifically, the composition may be $Sm_{1-x}Zr_x(Fe_{1-y}Co_y)_{12-z}T_zM$ $\{(0 \le x \le 0.2), (0 \le y \le 0.2), (0 \le z \le 1)\}$, wherein the M is Cu, Al or Ga, and the T is Mn, Mo, V, Si or Ti. The composition can be single-phase magnetic powder even in the absence of Co, and Co is added to increase saturation magnetization of the magnetic powder.

The metal including at least one of Ti, Zr, Mn, Mo, V and Si and the metal oxide including at least one of $MnO_2$, $MoO_3$, $V_2O_5$, $SiO_2$, $ZrO_2$ and $TiO_2$ are added to ensure phase stability.

The $ThMn_{12}$ structure has four crystal sites consisting of 2a, 8i, 8j and 8f. Rare earth metal atoms are located at site 2a and Fe elements are located at sites 8i, 8j and 8f. A distance between the Fe atoms at sites 8i, 8j and 8f is equal to or greater than a radius of the Fe atom. When the Ti, Mn, Mo, V, and Si elements substitute the Fe atoms and are located at sites 8i, 8j and 8f, the phase is stabilized because the Ti, Mn, Mo, V, and Si atoms are larger than the distance between the Fe atoms and cohesive energy of the $ThMn_{12}$ structure is reduced due to the substitution. This principle applies equally to the addition of $TiO_2$, $MnO_2$, $MoO_3$, $V_2O_5$ and $SiO_2$, which are oxides of the above metals.

On the other hand, Zr may be located at site 2a of the $ThMn_{12}$ structure by substituting the rare earth metal atom. Since the Zr atom is relatively smaller than the rare earth metal atom such as Nd and Sm, it causes shrinkage of the crystal lattice, and the substitution makes a substructure of the site 8i where the Fe is located even smaller, thereby stabilizing the phase. This principle applies equally to the addition of $ZrO_2$, which is an oxide of the Zr.

$ThMn_{12}$-type crystal phase has a tetragonal crystal structure. Since the $ThMn_{12}$ structure magnetic powder is poor in phase stability and contains a large amount of Fe as a by-product, a concentration of the Fe element is high and Alpha Fe phase or the like is easily precipitated. Therefore, it is difficult to obtain single-phase magnetic powder. However, as the magnetic powder according to an embodiment of the present disclosure is single-phase $ThMn_{12}$ structure magnetic powder having a reduced content of secondary phase such as Alpha Fe, FeTi, or $Fe_2Ti$, it is possible to prevent a decrease in the Fe concentration in the main phase caused by the precipitation of Alpha Fe, etc. Therefore, a decrease in saturation magnetization of the main phase and a decrease in coercive force of permanent magnet can be prevented.

Since the $ThMn_{12}$ structure magnetic powder is poor in phase stability, it is difficult to control the particle size of the particles constituting the magnetic powder to 10 micrometers or less when hydrogen is absorbed for the pulverizing process using a jet mill. On the other hand, the magnetic powder according to an embodiment of the present disclosure may be $ThMn_{12}$ structure magnetic powder in which the average particle size of the particles constituting the magnetic powder is controlled to 10 micrometers or less with a reduction-diffusion method. In the process of obtaining a sintered magnet by sintering the magnetic powder, the sintering process in a temperature range of 1000 to 1250° C. is necessarily accompanied by a growth of crystal grains, which acts as a factor for decreasing coercive force. Herein, a size of the crystal grain of the sintered magnet is directly related to a size of the initial magnetic powder. Therefore, as long as the average particle size of the magnetic powder is controlled to 10 micrometers or less as in the magnetic powder according to an embodiment of the present disclosure, a sintered magnet with improved coercive force may be obtained.

Subsequently, a method of preparing magnetic powder according to another embodiment of the present disclosure will be described in detail. The method of preparing magnetic powder according to an embodiment of the present disclosure may be a method of preparing rare earth magnetic powder. More specifically, the method may be a method of preparing $ThMn_{12}$ structure magnetic powder.

The method of preparing magnetic powder according to an embodiment of the present disclosure includes the steps of: preparing a mixture by mixing a rare earth oxide, a raw material, a metal, a metal oxide and a reducing agent; and synthesizing magnetic powder by heat-treating the mixture at a temperature of 800° C. to 1100° C. with a reduction-diffusion method, wherein the raw material includes at least one of Fe and Co, the metal includes at least one of Ti, Zr, Mn, Mo, V and Si, the metal oxide includes at least one of $MnO_2$, $MoO_3$, $V_2O_5$, $SiO_2$, $ZrO_2$ and $TiO_2$, and the magnetic powder has single-phase powder particles.

The reducing agent may include at least one of Ca, Mg, $CaH_2$, Na and Na—K alloy. Particularly, $CaH_2$ is preferable. The rare earth oxide may include neodymium oxide or samarium oxide.

The heat-treating may be performed in a tube furnace at a temperature of 800° C. to 1100° C. under an inert atmosphere for 10 minutes to 6 hours. Reduction and diffusion between the mixtures at a temperature of 800° C. to 1100° C. may synthesize the rare earth magnet powder without a separate pulverizing process such as coarse pulverization, hydrogen crushing, and jet milling or a surface treatment process. When the heat-treatment is performed for 10 minutes or less, the metal powder may not be sufficiently synthesized. When the heat-treatment is performed for 6 hours or more, there may be a problem in that the size of the metal powder becomes coarse and primary particles are formed together into lumps.

The metal and the metal oxide are added to ensure phase stability. The mixture may further include at least one of Cu, Al, Ga, $CuF_2$, $CaF_2$ and $GaF_3$.

After the step of reacting the mixture, a washing step for removing by-products of the reduction may further proceed. $NH_4NO_3$ is evenly mixed with the powder synthesized by the heat-treating, then immersed in methanol, and then homogenized once or twice using a homogenizer. Thereafter, $NH_4NO_3$ is dissolved in ethanol or methanol, and then washed and pulverized together with the synthesized powder and $ZrO_2$ ball in a Turbula mixer. Lastly, the powder is rinsed with acetone, and then vacuum dried to finish the washing step. The washing step may be performed under an $N_2$ atmosphere to minimize contact with air.

The rare earth magnetic powder thus prepared may be $ThMn_{12}$ structure magnetic powder. The magnetic powder may have a composition of $R_{1-x}Zr_x(Fe_{1-y}Co_y)_{2-z}T_zM$ $\{(0\leq x\leq 0.2), (0\leq y\leq 0.2), (0\leq z\leq 1)\}$, wherein the R is Nd or Sm, the M is Cu, Al or Ga, and the T is Mn, Mo, V, Si or Ti. More specifically, the composition may be $Sm_{1-x}Zr_x(Fe_{1-y}Co_y)_{12-z}T_zM$ $\{(0\leq x\leq 0.2), (0\leq y\leq 0.2), (0\leq z\leq 1)\}$, wherein the M is Cu, Al or Ga, and the T is Mn, Mo, V, Si or Ti.

$ThMn_{12}$-type crystal phase has a tetragonal crystal structure. Since the $ThMn_{12}$ structure magnetic powder is poor in phase stability and contains a large amount of Fe as a by-product, a concentration of the Fe element is high and secondary phase such as Alpha Fe, FeTi, or $Fe_2Ti$ is easily precipitated. Therefore, it is difficult to obtain single-phase magnetic powder. The precipitation of Alpha Fe or the like decreases the Fe concentration in the main phase, causing a decrease in saturation magnetization of the main phase and a decrease in coercive force of permanent magnet.

When the $ThMn_{12}$ structure magnetic powder is prepared by the conventional strip casting method, it is difficult to obtain magnetic powder in which the particle size of the particles constituting the magnetic powder is controlled to 10 micrometers or less. In addition, since the $ThMn_{12}$ structure magnetic powder is poor in phase stability, phase separation occurs when hydrogen is absorbed for the pulverizing process using a jet mill, and thus it is difficult to maintain single-phase.

According to an embodiment of the present disclosure, it is possible to provide single-phase $ThMn_{12}$ structure magnetic powder having an average particle size of 10 micrometers or less of the particles constituting the magnetic powder with reduced secondary phase such as Alpha Fe, FeTi or $Fe_2Ti$ through a reduction-diffusion method by adding a metal oxide, a metal, or a metal fluoride without a separate pulverizing process such as coarse pulverization, hydrogen crushing, and jet milling or a surface treatment process.

Then, the method of preparing magnetic powder according to the present disclosure will be described through specific Examples hereinafter.

Example 1

Addition of $ZrO_2$, $TiO_2$ and Cu

A mixture is prepared by uniformly mixing 8.500 g of $Sm_2O_3$, 23.957 g of Fe, 6.320 g of Co, 1.201 g of $ZrO_2$, 3.893 g of $TiO_2$, 0.309 g of Cu and 12.004 g of $CaH_2$ (reducing agent). The mixture is tapped in SUS of any shape and then reacted in a tube furnace for 1 to 3 hours under an inert gas (Ar, He) atmosphere at a temperature of 900° C. to 1050° C. After the reaction is completed, it is pulverized using a mortar to make magnetic powder, and then a washing process is performed to remove Ca and CaO, which are by-products of the reduction. The washing process is performed under a $N_2$ atmosphere to minimize contact with air. After uniformly mixing 50 g of $NH_4NO_3$ with the synthesized magnetic powder, it is soaked in 400 ml of methanol and homogenized using a homogenizer once or twice for effective washing. Thereafter, the magnetic powder and 200 g $ZrO_2$ ball are put together in ethanol or methanol in which 0.5 g of $NH_4NO_3$ is dissolved to proceed the washing process accompanied by pulverization using a Turbula mixer. Then, it is rinsed with acetone and then dried in vacuum.

Example 2

Addition of $TiO_2$ and reducing agent Na—K alloy 8.925 g of $Sm_2O_3$, 23.957 g of Fe, 6.320 g of Co, 3.893 g of $TiO_2$, and reducing agents (10.477 g of Ca and 0.918 g of Na—K alloy) are mixed uniformly, and then magnetic powder is synthesized by the method described in Example 1. After the synthesized magnetic powder is pulverized using a mortar, washing is performed by the method described in Example 1.

Example 3

Addition of $ZrO_2$, $TiO_2$ and $CuF_2$ 2.086 g of $Sm_2O_3$, 6.148 g of Fe, 1.622 g of Co, 0.295 g of $ZrO_2$, 0.478 g of $TiO_2$, 0.122 g of $CuF_2$ and 2.738 g of $CaH_2$ (reducing agent) are mixed uniformly, and then magnetic powder is synthesized by the method described in Example 1. After the synthesized magnetic powder is pulverized using a mortar, washing is performed by the method described in Example 1.

Example 4

Addition of $ZrO_2$, $TiO_2$ and Cu 2.086 g of $Sm_2O_3$, 6.148 g of Fe, 1.622 g of Co, 0.295 g of $ZrO_2$, 0.478 g of $TiO_2$, 0.076 g of Cu and 2.738 g of $CaH_2$ (reducing agent) are mixed uniformly, and then magnetic powder is synthesized by the method described in Example 1. After the synthesized magnetic powder is pulverized using a mortar, washing is performed by the method described in Example 1.

Example 5

Addition of $ZrO_2$, $TiO_2$ and Cu 2.215 g of $Sm_2O_3$, 5.989 g of Fe, 1.580 g of Co, 0.150 g of $ZrO_2$, 0.973 g of $TiO_2$, 0.077 g of Cu and 2.847 g of $CaH_2$ (reducing agent) are mixed uniformly, and then magnetic powder is synthesized by the method described in Example 1. After the synthesized magnetic powder is pulverized using a mortar, washing is performed by the method described in Example 1.

Example 6

Addition of $ZrO_2$, $TiO_2$ and Cu 2.215 g of $Sm_2O_3$, 6.098 g of Fe, 1.608 g of Co, 0.300 g of $ZrO_2$, 0.778 g of $TiO_2$, 0.077 g of Cu and 2.693 g of $CaH_2$ (reducing agent) are mixed uniformly, and then magnetic powder is synthesized by the method described in Example 1. After the synthesized magnetic powder is pulverized using a mortar, washing is performed by the method described in Example 1.

Example 7

Addition of $Nd_2O_3$, $TiO_2$ and $CaF_2$ 2.086 g of $Nd_2O_3$, 7.652 g of Fe, 0.9409 g of $TiO_2$, 0.2904 g of $CaF_2$ and 2.6092 g of Ca (reducing agent) are mixed uniformly, and then magnetic powder is synthesized by the method described in Example 1. After the synthesized magnetic powder is pulverized using a mortar, washing is performed by the method described in Example 1.

Comparative Example 1

Arc Melting

An alloy raw material prepared by mixing 1.54 g of Nd, 13.275 g of Fe, 4.425 g of Co, and 0.76 g of Ti is dissolved by arc melting, and then rapidly quenched at a rate of 50 K/sec to prepare flakes. The flakes are heat-treated at a temperature of 1100° C. for 4 hours under an Ar atmosphere, and then pulverized using a cutter mill under an Ar atmosphere to prepare magnetic powder.

Comparative Example 2

Rapid Quenching by Strip Casting Method 1.54 g of Nd, 13.275 g of Fe, 4.425 g of Co, and 0.76 g of Ti are mixed and dissolved in a melting furnace to prepare a molten metal. The molten metal is fed to a cooling roll and rapidly quenched at a rate of $10^4$ K/sec to prepare flakes. Magnetic powder is prepared by pulverizing the flakes using a cutter mill under an Ar atmosphere.

Comparative Example 3

Homogenization Heat-Treatment after Rapid Quenching by Strip Casting Method

Flakes are prepared in the same manner as in Comparative Example 2. The flakes are heat-treated at a temperature of 1200° C. for 4 hours under an Ar atmosphere, and then pulverized using a cutter mill under an Ar atmosphere to prepare magnetic powder.

Evaluation Example 1

XRD Pattern

XRD patterns of the magnetic powders prepared in Examples 1 to 6 are shown in FIG. 1, an XRD pattern of the magnetic powder prepared in Example 7 is shown in FIG. 2, and XRD patterns of the magnetic powders prepared in Comparative Examples 1 to 3 are shown in FIG. 3. Si in FIG. 2 is a material added to set a reference point of each point. Referring to FIG. 1, the magnetic powders according to Examples 1 to 6 were confirmed to have weak peak intensity of Alpha Fe or FeTi. Referring to FIG. 2, it was confirmed that the magnetic powder according to Example 7 did not show a peak of secondary phase such as Alpha Fe. On the other hand, referring to FIG. 3, the magnetic powders according to Comparative Examples 1 to 3 were confirmed to have apparent peak intensity of Alpha (Fe, Co) phase.

Evaluation Example 2

Volume Fraction

The volume fractions of secondary phase and unreacted materials of Examples 1, 2, Comparative Examples 1, 2, and 3 were measured according to Rietveld refinement method and EDS analysis, and the results are shown in Table 1 below.

TABLE 1

| | Volume fraction of secondary phase (%) | Volume fraction of unreacted materials (%) |
|---|---|---|
| Example 1 | 1.21 [$Fe_2Ti$] | — |
| Example 2 | 1.65 [Alpha Fe] | 0.67 |
| Comparative Example 1 | 17.5 [Alpha (Fe, Co)] | — |
| Comparative Example 2 | 6 [Alpha (Fe, Co)] | — |
| Comparative Example 3 | 3.9 [Alpha (Fe, Co)] | — |

All the magnetic powders prepared in Examples 1 to 2 have the volume fraction of secondary phase of 2% or less, and it can be confirmed that they are single-phase magnetic powders with high purity having a reduced content of the secondary phase compared to Comparative Examples 1 to 3.

Evaluation Example 3

Scanning Electron Microscope Image

Scanning electron microscope images of the $Sm_{0.8}Zr_{0.2}(Fe_{0.8}Co_{0.2})_{11}Ti_1Cu_{0.1}$ magnet powder prepared in Example 1 are shown in FIGS. 4 and 5, and scanning electron microscope images of the $Sm(Fe_{0.8}Co_{0.2})_{11}Ti_1$ magnet powder prepared in Example 2 are shown in FIGS. 6 and 7. Referring to FIGS. 4 to 7, it can be confirmed that an average particle size of the particles constituting the magnetic powder according to Examples of the present disclosure is 10 micrometers or less.

Preferred Examples of the present disclosure have been described in detail as above, but the scope of the present disclosure is not limited thereto, and their various modifications and improved forms made by those skilled in the art using a basic concept of the present disclosure defined in the following claims also belong to the scope of the present disclosure.

The invention claimed is:

1. A magnetic powder synthesized from reduction and diffusion of a mixture of a rare earth oxide, a raw material, a metal, a metal oxide and a reducing agent, wherein the magnetic powder is single-phase with a reduced secondary phase present at a volume fraction greater than 0% and up to 2%, wherein the secondary phase is Alpha Fe, FeTi, or $Fe_2Ti$, the mixture includes at least one of Cu, Al, or Ga, the raw material comprises Fe and Co, the metal comprises at least one of Ti, Zr, Mn, Mo, V or Si, and the metal oxide comprises at least one of $MnO_2$, $MoO_3$, $V_2O_5$, $SiO_2$, $ZrO_2$ or $TiO_2$, wherein the magnetic powder consists of a composition of $R_{1-x}Zr_x(Fe_{1-y}Co_y)_{12-z}T_zM$, wherein R is Nd or Sm, M is Cu, Al or Ga, and T is Mn, Mo, V, Si or Ti, wherein $R_{1-x}Zr_x(Fe_{1-y}Co_y)_{12-z}T_zM$ has $0 \le x \le 0.2$, $0 \le y \le 0.2$, $0 \le z \le 1$, wherein an average particle size of the particles constituting the magnetic powder is 10 micrometers or less.

2. The magnetic powder of claim 1, wherein the reducing agent comprises at least one of Ca, Mg, $CaH_2$, Na or Na—K alloy.

3. The magnetic powder of claim 1, wherein the rare earth oxide comprises neodymium oxide or samarium oxide.

4. The magnetic powder of claim 1, wherein the mixture further comprises at least one of $CuF_2$, $CaF_2$ or $GaF_3$.

5. The magnetic powder of claim 4, wherein the single phase of the magnetic powder has a $ThMn_{12}$ structure.

6. The magnetic powder of claim 5, wherein the magnetic powder has a composition of $Sm_{1-x}Zr_x(Fe_{1-y}Co_y)_{12-z}T_zM$ $\{(0 \le x \le 0.2), (0 < y \le 0.2), (0 \le z \le 1)\}$, in which the M is Cu, Al or Ga, and the T is Mn, Mo, V, Si or Ti.

7. A method of preparing the magnetic powder of claim 1, comprising:

preparing the mixture by mixing the rare earth oxide, the raw material, the metal, the metal oxide and the reducing agent; and synthesizing the magnetic powder by heat-treating the mixture at a temperature of 800° C. to 1100° C. with a reduction-diffusion method.

8. The method of preparing the magnetic powder of claim 7, wherein the reducing agent comprises at least one of Ca, Mg, $CaH_2$, Na or Na—K alloy.

9. The method of preparing the magnetic powder of claim 7, wherein the heat-treating is performed for 10 minutes to 6 hours.

10. The method of preparing the magnetic powder of claim 7, wherein the single phase of the synthesized magnetic powder has a $ThMn_{12}$ structure.

11. The method of preparing the magnetic powder of claim 7, wherein the rare earth oxide comprises neodymium oxide or samarium oxide.

12. The method of preparing the magnetic powder of claim 7, wherein the mixture further comprises at least one of $CuF_2$, $CaF_2$ or $GaF_3$.

13. The method of preparing the magnetic powder of claim 7, wherein the magnetic powder has a composition of $Sm_{1-x}Zr_x(Fe_{1-y}Co_y)_{12-z}T_zM$ $\{(0 \le x \le 0.2), (0 < y \le 0.2), (0 \le z \le 1)\}$, in which the M is Cu, Al or Ga, and the T is Mn, Mo, V, Si or Ti.

14. The method of preparing the magnetic powder of claim 7, wherein the preparing of the mixture does not include a pulverizing process or a surface treatment process.

* * * * *